H. C. McCENEY.
Horseshoes.
No. 199,302. Patented Jan. 15, 1878.
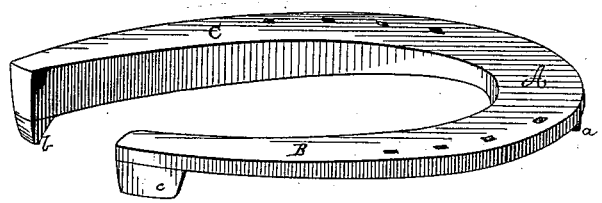
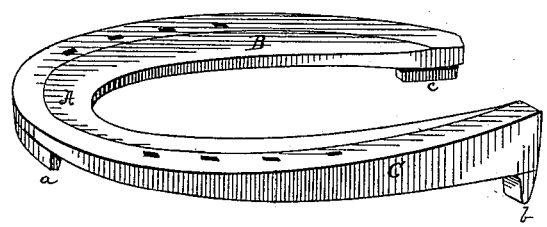
WITNESSES:
C. Clarence Poole
Rich. K. Evans
INVENTOR:
Henry C. McCeney
by his attys A. H. Evans & Co.

UNITED STATES PATENT OFFICE.

HENRY C. McCENEY, OF WASHINGTON, DISTRICT OF COLUMBIA.

IMPROVEMENT IN HORSESHOES.

Specification forming part of Letters Patent No. 199,302, dated January 15, 1878; application filed January 5, 1878.

*To all whom it may concern:*

Be it known that I, HENRY C. McCENEY, of the city and county of Washington, District of Columbia, have invented a new and Improved Horseshoe; and I hereby declare the following to be a full, clear, and exact description thereof, reference being had to the accompanying drawings, making part of this specification, in which—

Figure 1 is a perspective view of a hind shoe. Fig. 2 is a perspective view of a front shoe.

The object of my invention is to provide a shoe which will prevent a horse from cutting himself as his feet pass one another in traveling, such cutting being technically known as "interfering."

My invention consists in a shoe having the inside half, from the toe to the heel, constructed thinner than ordinary shoes, and the outside half constructed with a gradual increasing thickness and weight from the center of the toe toward the heel, leaving the surfaces of each side that is next to the hoof in the same plane. This throws the under side of the outside half below the under side of the inside half, and the weight of the horse on this uneven surface crimps or turns his hoofs slightly outward, and carries the portions of the inside halves of the shoes that do the cutting away from each other, and they escape the opposite hoofs or fetlocks when passing. The unevenly-distributed weight being greatly in excess on the outside tends to habituate a horse to throw his feet apart when stepping, and eventually cures all interfering.

In order that those skilled in the art may make and use my invention, I will proceed to describe the manner in which I have carried it out.

From about a central point, A, the inside half, B, of the shoe is made after the pattern, but preferably thinner than an ordinary shoe. The outside half, C, is made of a gradually-increasing thickness toward the heel, where it is from two to two and a half times as thick as the heel of side B.

This proportion may be varied somewhat in a rate to the extent of the interfering. The upper surface of both sides are left in the same plane, and the hoof is prepared as in applying an ordinary shoe. When the shoe is on, the lower surface of side C is below the lower surface of side B. This raises the outer edge of the hoof slightly, and crimps or turns the hoof slightly outward, thereby bringing side B outward and from the opposite hoof, so that the inside of neither shoe strikes the opposite hoof or fetlock.

In picking up his feet and moving them forward the horse is insensibly affected by the additional weight of outside C, and its tendency is to make him "straddle" slightly. This eventually gets the horse in the habit of stepping with his feet apart, so that he may be shod (as I have proven in actual practical application) with ordinary shoes, and not return to his habit of interfering.

Calks may be applied, as in ordinary shoes, as seen at $a\ b\ c$. The heel-calk on the inner side B I prefer to apply longitudinally, as seen at $c$, because it gives the horse broader and stronger hold at the point where the horse throws the greatest strain in heavy pulling.

I am aware that it is not new to make the inside of a horseshoe enlarged, as is shown in patent to N. J. Blatherwick of December 7, 1875, and such is not my invention.

I do not limit myself to the form or configuration shown, because it may be varied without departing from the spirit of my invention; but

Having thus described my invention, what I claim as new, and desire to secure by Letters Patent, is—

1. A horseshoe having its outer half of greater thickness than the inner half, substantially as and for the purpose described.

2. A horseshoe having its outer half of greater weight and thickness than the inner half, substantially as described.

3. A horseshoe having its outer half of a gradually-increasing weight and thickness from the center of the toe to the heel, and the inner half of ordinary construction, as and for the purpose set forth.

HENRY C. McCENEY.

Witnesses:
RICHD. K. EVANS,
GEO. H. EVANS.